United States Patent
Tyler

Patent Number: 5,823,719
Date of Patent: Oct. 20, 1998

[54] DRYWALL RASP

[76] Inventor: Gary L. Tyler, 3915 Hunters Ridge Dr., No. 1, Lansing, Mich. 48911

[21] Appl. No.: 731,711

[22] Filed: Oct. 17, 1996

Related U.S. Application Data

[60] Provisional application No. 60/006,036 Oct. 24, 1995.

[51] Int. Cl.[6] ............................................. B23D 67/00
[52] U.S. Cl. ........................ 407/29.1; 407/29.15; 76/88
[58] Field of Search ............................. 407/29.15, 29.1, 407/29.12, 29.14; 76/82, 83, 88

[56] References Cited

U.S. PATENT DOCUMENTS

| | | | |
|---|---|---|---|
| 2,515,469 | 7/1950 | Power | 407/29.15 |
| 3,501,821 | 3/1970 | Ford | 407/29.15 |
| 3,831,235 | 8/1974 | Weninger | 407/29.1 |
| 3,973,444 | 8/1976 | Skinner | 74/54 |
| 4,884,343 | 12/1989 | Sewell | 76/88 X |
| 5,042,127 | 8/1991 | Lamas | 407/29.15 |

*Primary Examiner*—A. L. Pitts
*Assistant Examiner*—Henry W. H. Tsai
*Attorney, Agent, or Firm*—Bliss McGlynn

[57] ABSTRACT

A rasp tool for smoothing the rough edges of cut drywall and the like including an elongated housing which is substantially U-shaped in cross-section and which defines a pair of legs disposed spaced relative to one another with each leg defining a distal end. A pair of slots extend along the inside surface of each of the legs longitudinally relative to the housing and parallel relative to each other. The housing further supports a rasp blade with the edges of the blade removably received in the pair of slots such that the blade is spaced from the distal ends of the legs so as to define slide guides on the inside surface of each of the legs.

8 Claims, 1 Drawing Sheet

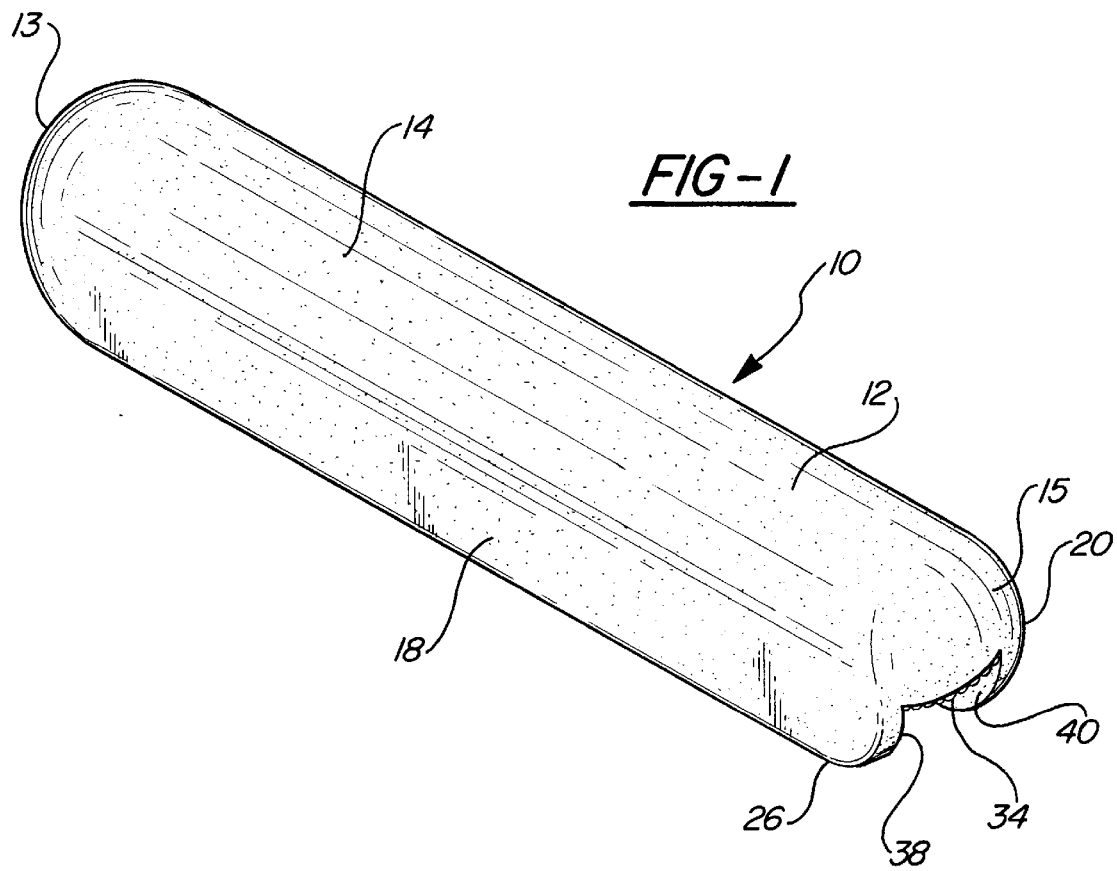
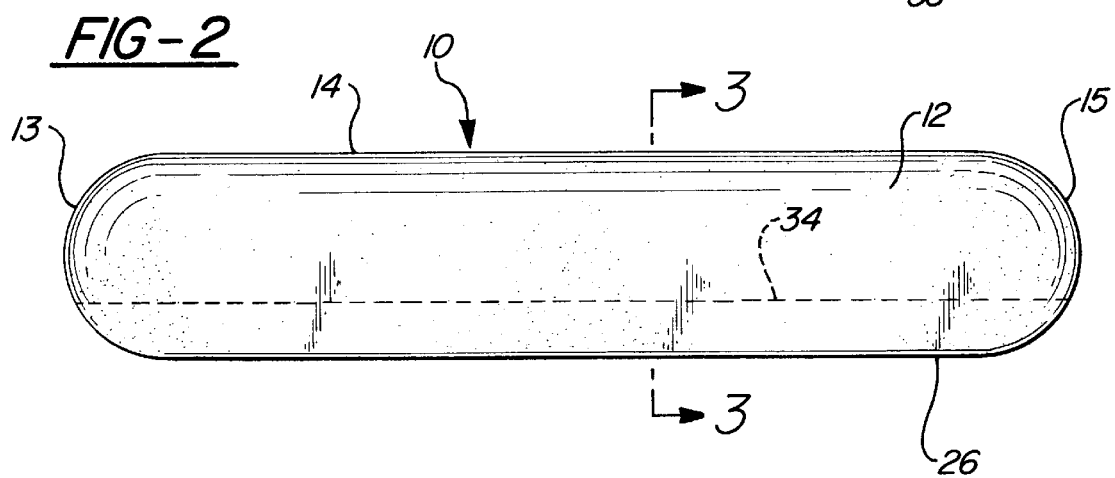
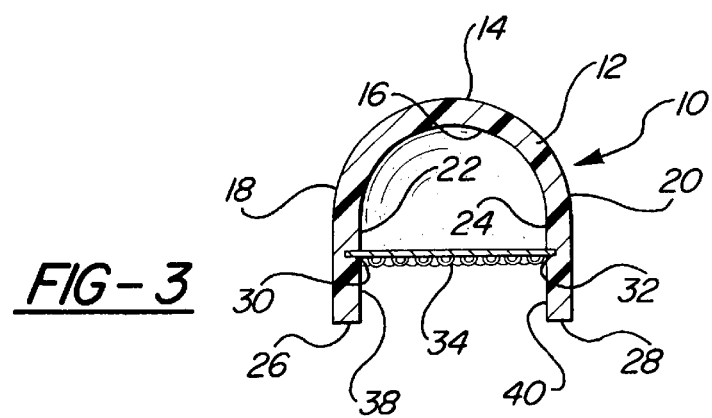

DRYWALL RASP

BACKGROUND OF THE INVENTION

This application claims priority to and all benefits of the provisional application having Ser. No. 60/006,036 filed Oct. 24, 1995 entitled Drywall Rasp now abandoned.

1. Field of the Invention

The present invention relates to an improved rasp tool and more specifically to a rasp which is specifically adapted to smooth the rough cut edge of drywall prior to installation.

2. Description Of the Related Art

Drywall, also known as wallboard, is made in part from gypsum and is supplied in the form of sheets which are then mounted to walls, ceilings and other structures to present an aesthetic, smooth surface. When sheets of drywall are being installed, it is often necessary to cut these sheets to size on the job. One common method of cutting drywall involves scoring the sheet with a sharp blade or other hand tool after which the sheet may actually be broken along the scored line by bending. The broken edge is invariably rough and must be smoothed prior to installation.

In order to smooth this rough edge, it is not uncommon for the artisan or drywall specialist to turn to the STANLEY® "Surform" rasp. However, this rasp is not specifically designed for the specific task at issue and is often employed for lack of a better device. The STANLEY® rasp is much larger than necessary for the job, is bulky and often slips off the rough cut edge of the drywall when in use. Furthermore, the replacement blades for this tool are expensive and require the use of a screwdriver for installation and removal.

Thus, there is need in the art for an inexpensive, sturdy, yet light weight rasp for removing the rough edge of cut drywall which wont fall off the edge when in use and which employ inexpensive, replaceable blades.

SUMMARY OF THE INVENTION

The present invention is directed toward a rasp tool which is specifically adapted for smoothing the rough edges of cut drywall or wallboard, as it is sometimes known, prior to installation. The rasp tool of the present invention includes an elongated housing which is substantially U-shaped in cross-section and defines a pair of legs disposed in spaced parallel relation relative to one another. Each leg includes a distal end. A pair of slots extend along the inside surface of each leg longitudinally relative to the housing and parallel relative to each other. The slot accommodates a rasp blade such that the blade is spaced from the distal ends of the legs so as to form slide guides on the inside surfaces of each leg. The slide guides extend between the blade and the distal ends of the legs on the inside facing surface of each leg.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a perspective view of the rasp tool of the present invention;

FIG. 2 is a side view of the rasp tool of the present invention; and

FIG. 3 is a cross-sectional end view of the rasp tool of the present invention taken substantially along lines 3—3 of FIG. 2.

DETAILED DESCRIPTION OF THE PREFERRED EMBODIMENT(S)

The drywall rasp of the present invention is generally shown at 10 throughout the Figures. The rasp 10 includes an elongated, integral, or one piece, housing or body 12. The housing 12 is substantially U-shaped in cross-section as shown in FIG. 3 and has a pair of rounded edges 13 and 15 as shown in FIGS. 1 and 2. The housing 12 may be molded from a sturdy plastic material for durability and low heat transfer properties when used in cold temperatures. Alternatively, the housing 12 may also be stamped from metal. The U-shaped housing 12 defines an arcuate outer surface 14 and a concave wall 16 disposed opposite the outer surface 14. The housing 12 further defines a pair of legs 18 and 20 which are disposed in spaced parallel relation relative to one another. The legs 18, 20 are spaced apart a sufficient distance to accommodate a ½ or ⅝ inch thick drywall sheet. The leg 18 defines an interior portion 22 which faces the interior portion 24 of the leg 20. Each leg 18, 20 includes distal ends 26, 28, respectively. A pair of slots extend along the inside surfaces of each leg 18, 20. More specifically, the leg 18 includes a slot 30 extending along the inner surface 22 thereof. Similarly, the leg 20 includes a slot 32 extending along the inside surface 24 thereof. The slots 30, 32 are parallel relative to each other and extend longitudinally relative to the housing 12. The slots 30, 32 also lie in a common plane which is spaced relative to the distal ends 26, 28 of the legs 18 and 20, respectively. The slots 30, 32 accommodate a rasp blade 34 such that the blade 34 is spaced from the distal ends 26 and 28 of the legs 18, 20, respectively, so as to form slide guides 38, 40. The slide guides 38, 40 are disposed on the inside surfaces 22, 24 of each leg 18, 20 and face one another. The slide guides 38, 40 extend between the blade 34 and the distal ends 26 and 28 of the legs 18 and 20 on the inside facing surfaces 22, 24 of each leg 18, 20.

The longitudinally extending housing 12 and thus the drywall rasp itself is smaller in width than the prior art STANLEY® Surform rasp and is thus more drywall-specific. Further, the blade 34 may be changed easily and no tools are required for this task.

In operation, the longitudinally extending arcuate housing 12 of the drywall rasp 10 is grasped by an operator and the blade 34 moved along the rough cut edge of the drywall (not shown). The slide guides 38, 40 maintain the blade 34 in positive engagement with the rough cut edge of the drywall by preventing the rasp 10 from falling off the edge. In this way, the problems of the prior art are overcome in an inexpensive, sturdy, effective drywall rasp which includes slide guides to prevent the rasp from falling off the rough cut edge when in use.

I claim:

1. A rasp tool for smoothing rough edges of cut drywall, said rasp tool comprising:

an elongated housing which defines an arcuate outer surface and a pair of rounded edges and which is substantially U-shaped in cross-section and which defines a pair of legs disposed spaced relative to one another with each leg defining a distal end and an inside surface;

a pair of slots defining opposed upper and lower spaced surfaces extending along said inside surface of each of said legs longitudinally relative to said housing and parallel relative to each other; and a rasp blade having a pair of edges which are removably received in said housing by sliding said edges into said pair of slots between said upper and lower spaced surfaces in a direction parallel to the longitudinal axis of said housing and such that said blade is spaced from the distal end of said legs so as to define slide guides on said inside surface of each of said legs, said rasp blade being held against movement in a direction perpendicular to the plane of said rasp blade by said opposed upper and lower spaced surfaces of said pair of slots.

2. A rasp tool as set forth in claim 1 wherein said slide guides extend substantially the length of said housing between said blade and said distal ends of said legs on said inside surface of each of said legs.

3. A rasp tool as set forth in claim 1 wherein said pair of slots lie in a common plane which is spaced relative to said distal ends of said legs.

4. A rasp tool as set forth in claim 1 wherein said pair of legs are disposed in spaced parallel relationship relative to one another.

5. A rasp tool as set forth in claim 4 wherein said legs are spaced apart a sufficient distance to accommodate ½ to ⅝ inch thick drywall sheets.

6. A rasp tool as set forth in claim 1 wherein said U-shaped housing defines an arcuate outer surface and a concave wall disposed opposite said outer surface.

7. A rasp tool as set forth in claim 1 wherein said housing is made of molded plastic.

8. A rasp tool as set forth in claim 1 wherein said housing is made of metal.

* * * * *